United States Patent [19]

Barnes

[11] Patent Number: 4,645,989
[45] Date of Patent: Feb. 24, 1987

[54] FREQUENCY SWITCHING CIRCUIT FOR MULTIPLE SCAN RATE VIDEO DISPLAY APPARATUS

[75] Inventor: Robert A. Barnes, Bainbridge, Pa.
[73] Assignee: RCA Corporation, Princeton, N.J.
[21] Appl. No.: 581,513
[22] Filed: Feb. 21, 1984
[51] Int. Cl.[4] .................. H01J 29/70; H01J 29/76
[52] U.S. Cl. ............................. 315/411; 315/408; 358/137
[58] Field of Search ............ 315/379, 400, 408, 403, 315/384, 411; 358/137, 158, 159, 11, 140

[56] References Cited

U.S. PATENT DOCUMENTS

| | | | |
|---|---|---|---|
| 3,784,872 | 1/1974 | James | 315/27 TD |
| 3,786,303 | 1/1974 | Hilburn | 315/27 TD |
| 3,816,792 | 6/1974 | Spencer, Jr. | 315/27 TD |
| 4,400,653 | 8/1983 | Olmstead | 315/387 |

OTHER PUBLICATIONS

Schematic Diagram of Conrac Monitor Scan Board, dated 3/17/81.

Primary Examiner—Theodore M. Blum
Assistant Examiner—Gregory C. Issing
Attorney, Agent, or Firm—Paul J. Rasmussen; Joseph Laks; Scott J. Stevens

[57] ABSTRACT

A video display apparatus operates at two or more horizontal scan rates. In order to prevent excessive collector voltage from being applied to the horizontal output transistor, a transition circuit turns off the horizontal output transistor when switching between horizontal scan frequencies occurs. The horizontal output transistor is maintained nonconductive until the correct oscillator frequency and supply voltage is coupled to the horizontal output circuit.

4 Claims, 1 Drawing Figure

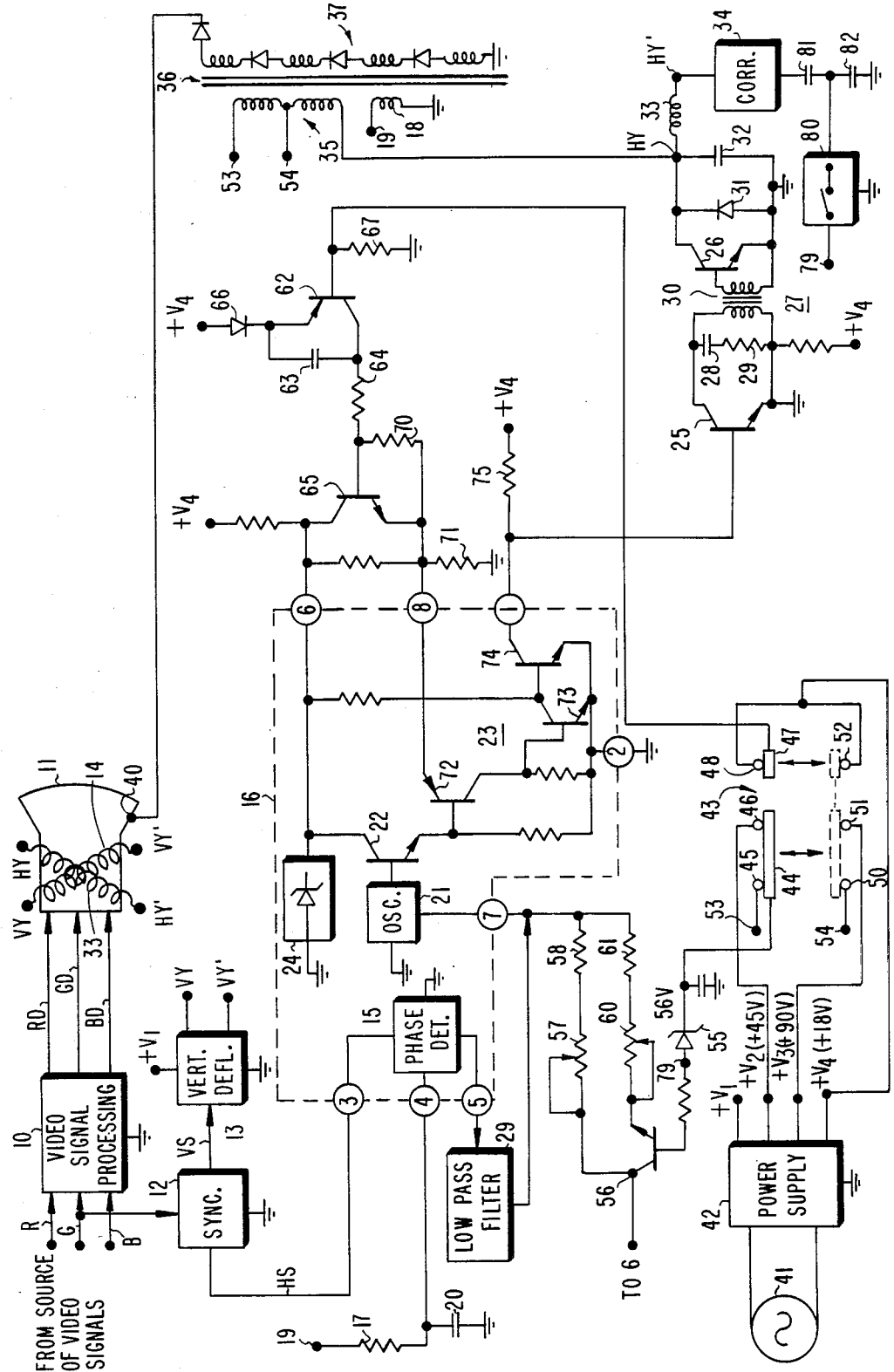

FREQUENCY SWITCHING CIRCUIT FOR MULTIPLE SCAN RATE VIDEO DISPLAY APPARATUS

This invention relates to video display apparatus having multiple line scane rates and, in particular, to circuits that permit rapid switching between scan frequencies.

It is desirable that some video display apparatus, such as monitors for computer applications or the like, provide the capability of multiple scan rates and, in particular, multiple scan rates for the line deflection circuits. This multiple scan rate capability is useful in adapting one monitor to a number of different computer systems, which may output information at different rates, without significant modifications. A single monitor might also be used to oversee the operation of several different computer system from a central location.

A multiple scan rate monitor which operates at a first horizontal frequency of 15.75 kHz and a second horizontal frequency of 31.5 kHz, for example, may utilize the same high voltage transformer, yoke inductance and retrace capacitor, thereby simplifying the deflection circuitry. The use of common components for both scan frequencies requires the deflection circuit operating voltages to be changed, in addition to the horizontal oscillator frequency.

When switching between horizontal scan rates, care must be taken to insure that switching occurs at a time when excessive voltage or current stresses are not placed on the horizontal output transistor of the horizontal deflection circuit. This requirement may be met by turning the monitor off before switching occurs; however, under some circumstances, it may be desirable to switch from one horizontal scanning rate to another while the monitor is in operation. It is also desirable to protect the monitor circuitry, particularly the horizontal deflection circuit, in the event the horizontal scan rate is switched inadvertently.

The present invention is directed to a power supply and multiple scan rate deflection circuit for a video display apparatus, such as a monitor, which allows switching from one horizontal scan rate to another while the monitor is in operation, without causing excessive voltage or current stresses to be placed on the horizontal deflection output transistor.

In accordance with the present invention, a multiple scan rate deflection circuit for a video display apparatus comprises a line deflection oscillator selectably operable at first and second rates. A switch has first and second positions with the first position causing the oscillator to operate at the first rate and a first voltage to be applied to an output transistor. The second switch position causes the oscillator to operate at the second rate and a second voltage to be applied to the output transistor. A circuit coupled to the oscillator controls the conduction of the output transistor. A circuit coupled to the switch and to the transistor conduction control circuits causes the output transistor to be substantially nonconductive for a predetermined period of time when the switch is moved between the first and second positions.

In the accompanying drawing, the sole FIGURE is a schematic and block diagram of a portion of a video display apparatus incorporating a multiple scan rate deflection circuit in accordance with an aspect of the present invention.

Referring to the FIGURE, there is shown a portion of a video display apparatus, such as a color video monitor suitable for use with a computer system. Red, green and blue video signals are provided by a video signal source (not shown), such as a computer, and are applied along conductors R, G and B to video signal processing circuitry 10, which generates red, green and blue drive signals which are applied along conductors RD, GD and BD to a cathode ray tube 11.

The green video signal, which also incorporates synchronizing information, is also applied to a synchronizing pulse separator circuit 12. The synchronizing information may also be applied directly to sync separator 12 along a separator input conductor.

Sync separator 12 provides vertical sync pulses along a conductor VS to vertical deflection circuitry 13, which in turn generates vertical or field rate deflection current that is applied via terminals VY and VY' to a vertical deflection winding 14 located on kinescope 11.

Sync separator 12 also provides horizontal or line rate sync pulses on a conductor HS that are applied to one input of a phase detector 15. Phase detector 15 is illustratively shown as comprising a portion of an integrated circuit 16 but may be embodied as discrete circuitry as well. The integrated circuit 16 is shown outlined by a dashed line and may illustratively be embodied as RCA CA1391, with the terminal pin numbers designated as shown.

Winding 18 of a high voltage transformer 36 produces horizontal rate pulses at a terminal 19 which are integrated by resistor 17 and capacitor 20 to form a horizontal rate ramp signal that is applied to a second input of phase detector 15. Phase detector 15 is coupled to a horizontal or line rate oscillator 21 via an external low pass filter 9. When an out-of-phase condition between the horizontal sync pulses and the horizontal rate ramp signal is detected, phase detector 15 produces an output signal that adjusts the frequency of oscillator 21 to restore an in-phase condition.

The output of oscillator 21 is applied to the base of a transistor 22, which is part of a horizontal deflection predriver circuit 23. The collector of transistor 22 is coupled to an internal voltage regulator 24 for integrated circuit 16. Predriver circuit 23 provides switching pulses to the base of a horizontal drive transistor 25 which controls the conduction of a horizontal output transistor 26 of a horizontal deflection output circuit 27 via a transformer 30. Transformer 30 is phased so that conduction of driver transistor 25 causes output transistor 26 to be cut off. Capacitor 28 and resistor 29 form a snubber circuit for the primary winding of transformer 30. Output circuit 27 also comprises a damper diode 31, retrace capacitor 32, horizontal deflection winding 33, raster distortion correction circuitry 34, and an S-correction circuit comprising capacitors 81 and 82 and a switch 80. Circuitry 34 may include, for example, side pincushion distortion correction circuits and linearity correction circuits.

Power is provided to output circuit 27 via a primary winding 35 of high voltage transformer 36. When output transistor 26 is cut off, a horizontal retrace pulse appearing across primary winding 35 is used to generate a high voltage level via secondary windings 37 that is applied to the high voltage or ultor terminal 40 of cathode ray tube 11.

Power to operate the various circuits of the video display apparatus of the FIGURE is derived from an AC line supply 41 by power supply circuitry 42, which incorporates, for example, a transformer and switched mode regulator for generating various operating DC voltages, illustrated as $+V_1$, $+V_2$, $+V_3$ and $+V_4$.

The video display apparatus of the FIGURE is capable of operating at two horizontal scanning frequencies, for example, 15.75 kHz and 31.5 kHz. The desired horizontal rate is selected via switch 43 which, in accordance with an aspect of the invention, is a break before make switch. In a first switch condition, a switch element 44 is in a first position in contact with switch terminals 45 and 46, and switch element 47 is in contact with switch terminal 48. In a second switch condition, switch element 44 is in a second position in contact with switch terminals 50 and 51, while switch element 47 is in contact with switch terminal 52.

Switch element 44 is coupled to a zener diode 55. In the first switch condition, the +45 volts applied to zener diode 55 via switch element 44 is not sufficient to cause zener diode 55 to break down. Transistor 56 does not conduct so that the oscillator 21 frequency is determined by the integrated circuit regulated voltage (at pin 6) being applied to oscillator 21 via variable frequency adjusting resistor 57 and resistor 58, causing oscillator 21 to operate at the lower horizontal scan rate, i.e., 15.75 kHz.

In the second switch condition, the +90 volts applied to zener diode 55 via switch element 44 is sufficient to cause zener diode 55 to break down, thereby causing transistor 56 to conduct, so that the voltage at integrated circuit pin 6 is applied to oscillator 21 via resistors 57 and 58 and frequency adjusting resistor 60 and resistor 61, causing oscillator 21 to operate at its higher horizontal scan rate, i.e., 31.5 kHz. The output of zener diode 55 at a terminal 79 is also applied to switch 80 which controls the amount of S-correction provided to the horizontal deflection current. At the lower horizontal rate, switch 80 causes capacitor 82 to be bypassed. At the higher horizontal scan rate, S-correction is provided by capacitors 81 and 82 in series. The frequency selection arrangement and S-correction switching are described in U.S. Pat. No. 4,588,929, issued May 13, 1986, in the names of W. F. Wedam et al,, herein incorporated by reference.

When switch 43 is in its first condition, the $+V_2$ voltage from power supply 42, illustratively of the order of +45 volts, which is applied to switch terminal 46 is also caused to be applied to switch terminal 45 and switch element 44. Switch terminal 45 is coupled to terminal 53 of primary winding 35 of high voltage transformer 36. In the second switch condition, the $+V_3$ voltage, illustratively of the order of +90 volts, is applied via switch terminal 50 to terminal 54 of primary winding 35. The different voltage levels act to maintain proper scan amplitude for different horizontal scan rates. The different number of primary winding turns selected for different horizontal scan frequencies provides high voltage stabilization. This is described in U.S. Pat. No. 4,536,684, issued Aug. 20, 1985, in the name of W. E. Babcock, herein incorporated by reference.

Switch element 47 causes the $+V_4$ voltage, illustratively of the order of +18 volts, to be applied to the base of a transistor 62 in either its first or second positions. In accordance with an aspect of the present invention, there is no voltage applied to transistor 62 via switch element 47 when the switch 43 is being switched between its first and second conditions. As will be described, this allows switching from one horizontal deflection rate to another while the video display apparatus is operating without damaging the horizontal output transistor. If switching occurs so that the horizontal output transistor is turned on during the horizontal retrace interval, the retrace pulse voltage at the collector of transistor 26 may cause the transistor to conduct in an excessively dissipative manner. Also, if in transition, the horizontal oscillator were to operate at the lower horizontal rate while the higher supply voltage was applied to winding 35, excessive deflection winding current would result, causing a potentially damaging retrace pulse on the collector of transistor 26, causing transistor 26 to fail. The present invention, however, protects transistor 26 during horizontal scan rate transitions.

When switch element 47 is in either of its first or second positions, the $+V_4$ supply will be applied to the base of transistor 62, causing transistor 62 to be turned off. Capacitor 63 becomes charged, resulting in no current flow through resistor 64, so that transistor 65 is biased off. Integrated circuit 16 operates in its normal manner.

When switch 43 is moved to an open circuit position, i.e., when switch element 47 is between its first and second positions, current will flow through diode 66, transistor 62 and resistor 67, causing transistor 62 to saturate. Capacitor 63 becomes discharged, allowing current to flow through diode 66, transistor 62, resistors 64 and 70, transistor 65, and resistor 71, thereby saturating transistor 65. This in turn will saturate transistors 72 and 73, which will cause transistor 74 to be cut off. This allows current to flow from the $+V_4$ supply through resistor 75 to the base of driver transistor 25, thereby saturating transistor 25. With transistor 25 saturated, the phasing of transformer 30 produces a voltage which will reverse bias horizontal output transistor 26, which will turn transistor 26 off if it is conducting, or will maintain it cut off if it is not conducting. This turn-off action of transistor 26 occurs rapidly before the operating voltage and oscillator can switch.

By turning horizontal output transistor 26 off when switching between horizontal scan frequencies occurs, the danger that excessive deflection winding current will result or that output transistor 26 will be turned on with an excessive voltage level at its collector is eliminated.

After switch element 47 makes contact with switch terminal 48 or 52, transistor 62 will be cut off. Current will continue to flow through resistor 64, thereby keeping output transistor 26 off in the manner previously described, until capacitor 63 becomes charged. Once capacitor 63 is charged, transistor 65 becomes cut off, and integrated circuit 16 and output circuit 27 resume normal operation. The finite time required for capacitor 63 to charge allows the desired supply voltage $+V_2$ or $+V_3$ to become coupled to transformer 36 and oscillator 21 to begin operating at the desired horizontal frequency, in response to the frequency selected via switch 43.

It is of course possible to provide an electronic switch in place of the mechanical switch illustratively shown in the FIGURE by following the principles of the invention espoused above.

What is claimed is:

1. A multiple scan rate deflection circuit for a video display apparatus comprising:
   a line deflection oscillator selectably operable at first and second rates;

a source of first voltage;
a source of second voltage;
a line deflection winding;
a line deflection output stage incorporating output switching means coupled to said line deflection winding;
switch means having first and second positions, said first position causing said oscillator to operate at said first rate and causing said source of first voltage to be coupled to said output transistor, said second position causing said oscillator to operate at said second rate and causing said source of second voltage to be coupled to said line deflection output stage;
first means coupled to said oscillator for controlling the conduction of said output switching means to generate scanning current in said line deflection winding; and
second means coupled to said switch means and said conduction controlling means for causing said output switching means to be substantially nonconductive for a predetermined period of time when said switch means changes states between said first and second positions.

2. The arrangement defined in claim 1, wherein said means for causing said output switching means to be nonconductive comprises a resistor and a capacitor, said capacitor becoming discharged when said switch means changes states, said capacitor becoming charged when said switch means is in said first or second positions, said output switching means being nonconductive when the voltage across said capacitor is below a predetermined level.

3. The arrangement defined in claim 1, wherein said switch means comprises a mechanical switch having an intermediate open circuit position which activates said second means when said switch means is in said intermediate position and keeps said second means deactivated when said switch means is in said first and second positions.

4. A multiple scan rate deflection circuit for a video display apparatus comprising:
a line deflection oscillator selectably operable at first and second line rates;
a line deflection output stage, coupled to said line deflection oscillator, including an output switch periodically switched between conductive and nonconductive states;
means coupled to said line deflection oscillator for causing said oscillator to change operation from one of said first and second line rates to the other line rate; and
means for rendering said output switch nonconductive for a predetermined time during the transition from said one to said other line rate, such that said switch cannot be rendered conductive during said predetermined interval.

* * * * *